BALTZLY & HOBSON.
Reaper.
No. 19,118.
Patented Jan'y 19, 1858.
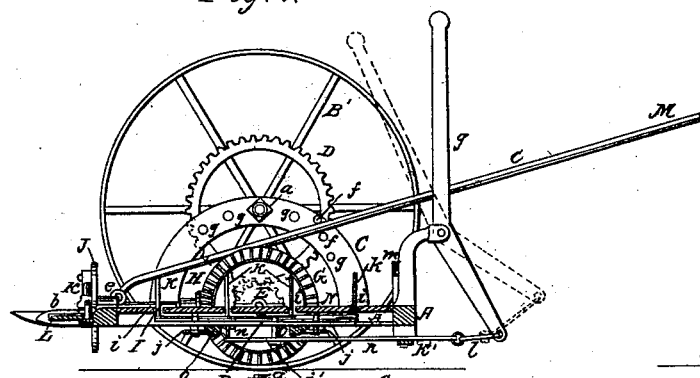
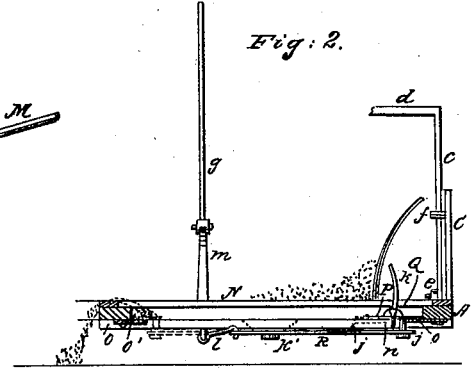
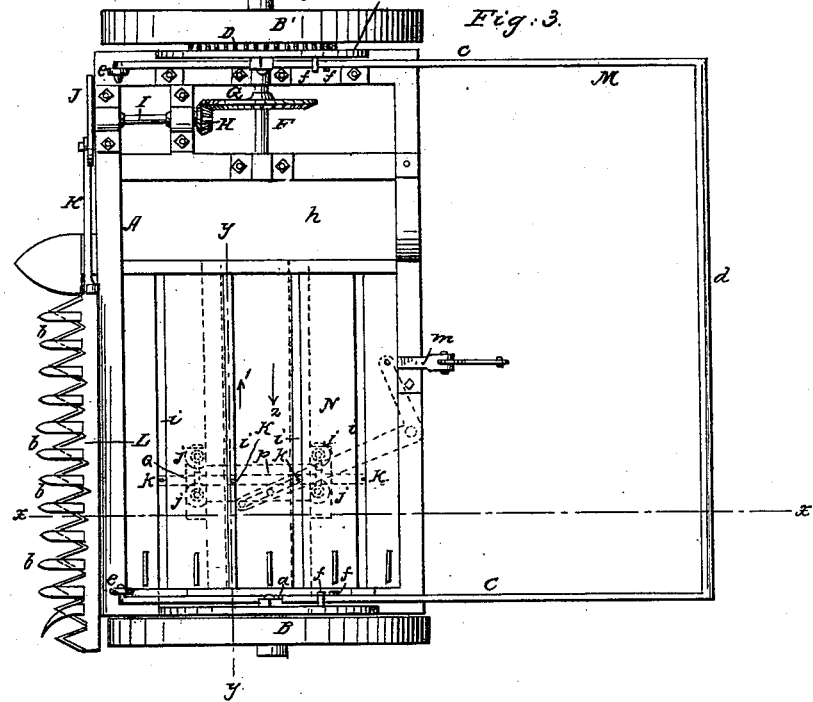

UNITED STATES PATENT OFFICE.

JOHN W. BALTZLY AND W. HOBSON, OF PANA, ILLINOIS.

IMPROVEMENT IN HAND-REAPERS.

Specification forming part of Letters Patent No. 19,118, dated January 19, 1858.

*To all whom it may concern:*

Be it known that we, J. W. BALTZLY and WILLIAM HOBSON, both of Pana, in the county of Christian and State of Illinois, have invented a new and Improved Reaping-Machine Designed for Manual Operation; and we do hereby declare that the following is a full, clear, and exact description of the same, reference being had to the annexed drawings, making a part of this specification, in which—

Figure 1 is a vertical section of our improvement, taken in the line $x$ $x$, Fig. 3. Fig. 2 is a vertical section of a portion of the same, taken in the line $y$ $y$, Fig. 3. Fig. 3 is a plan or top view of the same.

Similar letters of reference indicate corresponding parts in the several figures.

This invention consists in a novel means employed for adjusting the sickle or cutting device, whereby the same may be made to cut the grain at the desired height from the surface of the ground, and so arranged with especial reference to the manual operation of the machine that the same may be shoved along or propelled with facility.

To enable those skilled in the art to fully understand and construct our invention, we will proceed to describe it.

A represents the frame of the machine, which is of rectangular form, and supported by two wheels, B B'. The axes $a$ $a$ of these wheels are attached to semicircular bars C C, which are secured one at each end of the frame A, and allow the employment of large wheels, and at the same time permit the frame A to be quite near the surface of the ground. This will be understood by referring to Fig. 1.

To the wheel B' a spur or toothed wheel, D, is attached, and this wheel gears into a pinion, E, which is placed on the outer end of a shaft, F, on the frame A. On the shaft F a bevel-wheel, G, is placed, and this wheel gears into a bevel-pinion, H, on a shaft, I, in the frame A. The front end of shaft I has a crank-pulley, J, attached, and a connecting-rod, K, is connected thereto. The rod K drives a sickle, L, which may be of the usual reciprocating kind, and arranged in the ordinary way to work through slotted fingers $b$, which are attached to the front end of the machine.

M is a rod or bar, so bent as to form two parallel sides, $c$ $c$. The front ends of the sides $c$ $c$ are hooked or bent, so as to fit in staples $e$ $e$ at the front part of the frame, and the sides $c$ $c$ may be secured at a greater or less angle with the frame A by means of pins $f$, which are fitted in holes $g$ in the semicircular bars C C. This will be understood by referring to Figs. 1 and 3.

N represents the platform, which is placed on the frame A, directly behind the sickle L, a space, $h$, being allowed between the inner end of the platform and the driving-gear to allow the cut grain to be raked off the platform. The platform N is slotted longitudinally, as shown at $i$, and to the frame A, underneath the platform, N two metal guide-bars, O O, are attached, said bars being parallel with the front and back sides of the frame.

P is a plate which rests on the bars O O, and is retained properly thereon by guide-rollers $j$, attached to the under side of the plate, two near each end, so that they may bear on the outer sides of the bars, as shown in Fig. 1 and by dotted lines in Fig. 3.

On the plate P a shaft, Q, is placed, said shaft being allowed to turn or work freely in its bearings, and to the shaft Q teeth $k$ are attached, said teeth, when moving in the direction indicated by arrow 1, projecting up through the slots $i$ and forming a rake to rake the cut grain off the platform.

To the under side of the plate P a screw, $j'$, is attached, and this screw projects through the inner end of a slotted bent lever, R, which is pivoted to the under side of the frame A, as shown at $k'$. The outer end of the lever R is connected by a link, $v$, with the lower end of a lever, S, which is pivoted to a short upright bar, $m$, at the back end of the frame A.

To the shaft Q a projection, $n$, is attached, and a small plate is attached to the under side of the frame A at each end of the platform N, (see Fig. 2,) in which both plates are seen, and designated by O O'.

The operation is as follows: The operator grasps the part $d$ of the bent rod or bar M and pushes the machine along, the sickle L being driven from the wheel B' by means of the gearing previously described, and the sickle L adjusted so as to cut the grain the requisite height by securing the sides $c$ $c$ of the bar M, by means of the pins $f f$, at the proper angle. When the platform N is filled with cut grain, or a proper quantity is upon it, the operator shoves forward the upper end of lever S, and the teeth $k$ are moved by means of the slotted bent lever R in the direction indicated by arrow 1, and the grain is raked off the platform, falling through the space $h$ on to the ground. The operator then moves the lever S in the opposite direction, and the teeth $k$ are moved backward in the direction indicated by arrow 2, the teeth $k$ being depressed below the platform N during their return movement in consequence of the projection $n$ on shaft Q striking the plate O', said teeth being raised up through the slits $i$ in the platform, when moving in the direction of arrow 1, in consequence of the projection $n$ striking the plate O at the opposite end of the frame.

We do not claim the sickle L, nor the manner of operating or driving it; nor do we claim a rake working through a slotted platform; but,

Having thus described our invention, what we claim as new, and desire to secure by Letters Patent, is—

The semicircular bars C, connected with the frame A, and having the axes $a$ $a$ of the wheels B B' attached, and provided with pins $f$, in connection with the rod or bar M, attached to the frame A and arranged relatively with the above-named parts as herein described, so that the sickle may be adjusted at the required height with facility and a proper handle or device obtained for the ready propulsion of the machine by hand.

JOHN W. BALTZLY.
WILLIAM HOBSON.

Witnesses:
W. A. GOODRICH,
S. S. CISNA.